(12) United States Patent
Friedman et al.

(10) Patent No.: US 11,533,392 B1
(45) Date of Patent: Dec. 20, 2022

(54) SOLID-STATE ILLUMINATION SYSTEM FOR COMPACT MICROSCOPY

(71) Applicant: Hound Labs, Inc., Oakland, CA (US)

(72) Inventors: Daniel H. Friedman, Mountain View, CA (US); Michael V. D'Ambrosio, Berkeley, CA (US)

(73) Assignee: Hound Labs, Inc., Oakland, CA (US)

( * ) Notice: Subject to any disclaimer, the term of this patent is extended or adjusted under 35 U.S.C. 154(b) by 0 days.

(21) Appl. No.: 17/302,574

(22) Filed: May 6, 2021

Related U.S. Application Data

(60) Provisional application No. 63/021,000, filed on May 6, 2020.

(51) Int. Cl.
*H04M 1/00* (2006.01)
*H04M 1/02* (2006.01)
(Continued)

(52) U.S. Cl.
CPC ........... *H04M 1/0264* (2013.01); *F21V 5/006* (2013.01); *G02B 5/0294* (2013.01); *G02B 6/0088* (2013.01); *G02B 21/06* (2013.01); *G02B 21/361* (2013.01); *G02B 21/362* (2013.01); *H04N 5/2254* (2013.01); *F21V 7/0075* (2013.01); *F21Y 2115/10* (2016.08)

(58) Field of Classification Search
CPC ..................... G02B 5/0294; G02B 6/00–0096
See application file for complete search history.

(56) References Cited

U.S. PATENT DOCUMENTS

| 4,729,070 A * | 3/1988 | Chiu .................. F21V 17/02 |
| | | 362/372 |
| 10,345,239 B1 * | 7/2019 | Sinha ................... G01N 21/645 |

(Continued)

FOREIGN PATENT DOCUMENTS

| JP | 08062425 A * | 3/1996 | ......... G01N 21/8806 |
| WO | WO-2011144212 A1 * | 11/2011 | ......... G01N 15/1475 |
| WO | WO-2017053676 A1 * | 3/2017 | .............. G01J 3/021 |

OTHER PUBLICATIONS

D'Ambrosio, M. et al., "Point-of-care quantification of blood-borne filarial parasites with a mobile phone microscope", Science Translational Medicine (May 6, 2015), vol. 7, Issue 286, pp. 286re4. 10 pages.

(Continued)

*Primary Examiner* — Gerald J Sufleta, II
(74) *Attorney, Agent, or Firm* — Mahamedi IP Law LLP

(57) ABSTRACT

Provided is a solid-state illumination system for use in a microscopy system utilizing a light sensor of a mobile phone camera module. The system includes a bright-field illumination source with an array of light-emitting diodes (LEDs). The array of LEDs is configured to produce transmission light within a range of view of the light sensor of the mobile phone camera module. The system also includes a dark-field illumination source including a ring of LEDs. The ring of LEDs is configured to produce light outside of the range of collection of the camera module lens. The system also includes a diffuser configured to diffuse the transmission light and a diffusive black material coupled to the diffuser. The diffusive black material is configured to pass through at least some of the transmission light while blocking reflections of the scattering light.

20 Claims, 8 Drawing Sheets

(51) Int. Cl.
  *H04N 5/225* (2006.01)
  *F21V 5/00* (2018.01)
  *G02B 5/02* (2006.01)
  *F21V 8/00* (2006.01)
  *G02B 21/06* (2006.01)
  *G02B 21/36* (2006.01)
  *F21V 7/00* (2006.01)
  *F21Y 115/10* (2016.01)

(56) References Cited

U.S. PATENT DOCUMENTS

| | | | |
|---|---|---|---|
| 2006/0184037 A1* | 8/2006 | Ince | A61B 1/0607 |
| | | | 600/476 |
| 2012/0092131 A1* | 4/2012 | Vasic | G02B 6/0045 |
| | | | 362/559 |
| 2013/0129181 A1* | 5/2013 | Glensbjerg | G01N 15/1475 |
| | | | 382/133 |
| 2017/0108672 A1* | 4/2017 | Chang | G02B 5/005 |
| 2020/0379229 A1* | 12/2020 | Huang | G02B 21/0008 |

OTHER PUBLICATIONS

Switz, N. A., et al., "Low-Cost Mobile Phone Microscopy with a Reversed Mobile Phone Camera Lens", PloS one, (May 22, 2014), 9(5):e95330. 7 pages.

* cited by examiner

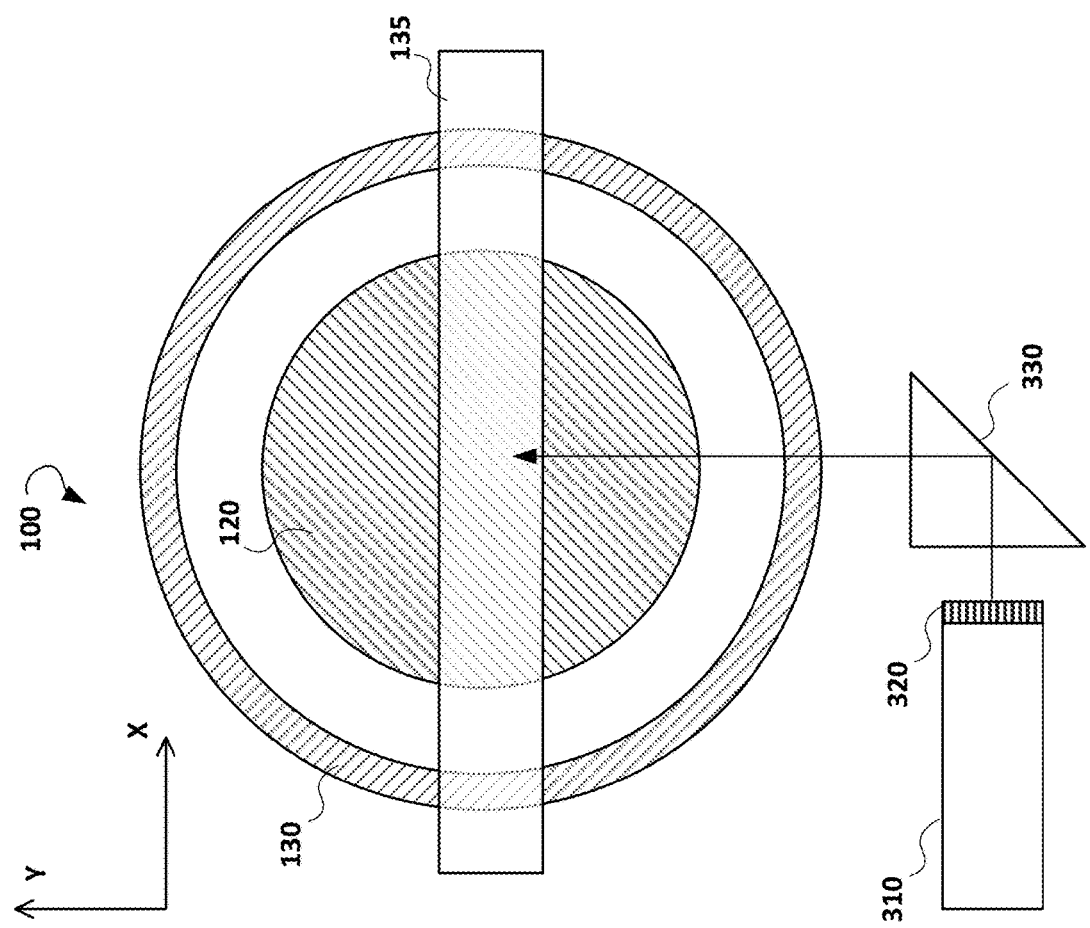

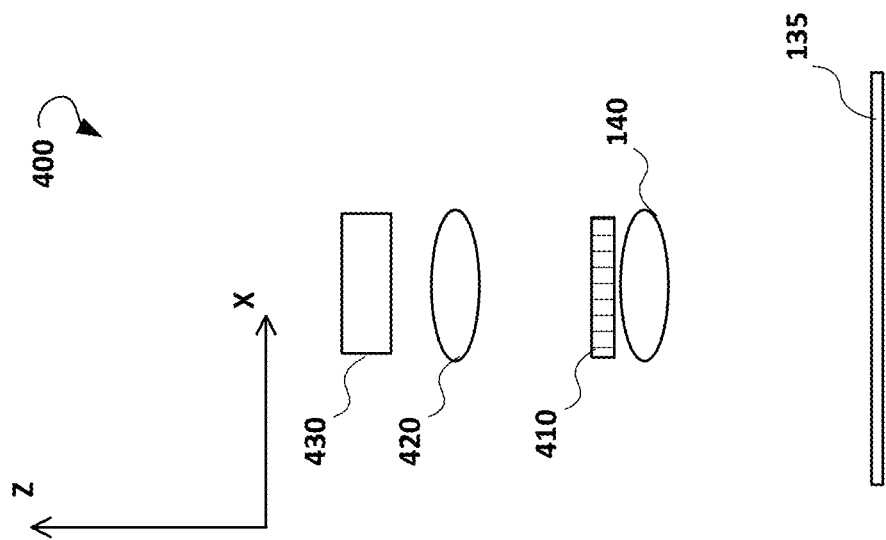

SOLID-STATE ILLUMINATION SYSTEM FOR COMPACT MICROSCOPY

RELATED APPLICATIONS

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD

The application relates generally to microscopy systems and, specifically, to a solid-state illumination system for use in a microscopy system, e.g., such as a portable device for detecting chemicals and microorganisms in specimens.

BACKGROUND

Microscopy is a robust way to diagnose various diseases. However, the traditional microscopy techniques are expensive both on the image collection side and the image interpretation side. Other issues include size, weight, and difficulty of use of devices used with traditional microscopy techniques.

Recent advances in microscopy have leveraged modern mass-produced mobile phones, which include high-quality light sensors and lenses. Through coupling of a mobile phone with an auxiliary lens system, a reversed-lens imager can be provided that provides for non-telecentric imaging in an inexpensive and robust format. Such devices are quite useful in environments in which access to laboratory-grade microscopy devices is limited or non-existent, e.g., in the wilderness or in remote communities. Moreover, such devices may be relatively compact, e.g., the approximate size of a smart phone but on the order of two inches thick instead of the typical 0.5 inches or less thickness of a smart phone, e.g., on the order of 4" by 2" by 8".

However, in order to effectively use most microscopy systems, the sample being imaged must typically be illuminated. Microscopy systems typically use one or both of two types of illumination—bright-field illumination and dark-field illumination. In bright-field illumination, light typically passes through the sample being imaged and into the imaging optics. In dark-field illumination, light from an illumination source is directed at the sample at an oblique angle such that the light that reaches the imaging optics is light that was reflected or scattered off of specimens in the sample, whereas light from the illumination source that is not reflected or scattered off of the specimens does not pass through the imaging optics. However, these techniques may be difficult to implement in microscopy systems utilizing mobile phone lenses due to the size limitations and the non-telecentric nature of mobile phone lenses.

SUMMARY

Details of one or more implementations of the subject matter described in this specification are set forth in the accompanying drawings and the description below. Other features, aspects, and advantages will become apparent from the description, the drawings, and the claims.

In some implementations, an apparatus may be provided that includes a solid-state system illumination system including a plurality of first light-emitting diodes (LEDs) distributed across a circular region of a substrate, a plurality of second LEDs arranged distributed within an annular region encircling the circular region, a light guide having one or more first surfaces facing towards the substrate and the second LEDs and one or more second surfaces facing at least partially radially inwards towards a center axis that passes through the center of the circular region of the substrate, the light guide made of an optically transmissive material, a separator-diffuser positioned within a volume bounded, at least in part, by the substrate and the light guide, the separator diffuser having a first surface facing towards the substrate and a second surface facing away from the substrate, wherein the material providing the first surface has a higher absorption coefficient than the material providing the second surface, and an optically opaque mount that supports the separator-diffuser within the volume, encircles the first LEDs, and prevents light from the first LEDs from reaching the light guide without first passing through the separator-diffuser and light from the second LEDs from reaching the first LEDs without also first passing through the separator-diffuser.

In some implementations, the separator-diffuser may include a thin layer of black diffusive material and one or more layers of translucent diffusive material interposed between the black diffusive material and the substrate.

In some such implementations, the thin layer of black diffusive material may be black diffusive acrylic material.

In some further such implementations, the thin layer of black diffusive material may be black acrylic material that has been sanded or ground with 220-grit sandpaper.

In some additional such implementations, the thin layer of black diffusive material may be approximately 350 micrometers thick.

In some implementations, the light guide may be dome-shaped and may have a nominally circular opening in the center, centered on the center axis, that provides the one or more second surfaces.

In some such implementations, the opening may be smaller than the separator-diffuser and the separator-diffuser may be interposed between the opening and the substrate.

In some implementations, the opaque mount may have a conical frustum shape.

In some implementations, the first LEDs may be electrically connected with a first circuit in the substrate, the second LEDs may be electrically connected with a second circuit in the substrate, and the first circuit and the second circuit may be configured to be powered independently of one another.

In some implementations, the first LEDs may all have an identical first spectral profile, the second LEDs may all have an identical second spectral profile, or the first LEDs may all have identical first spectral profiles and the second LEDs may all have identical second spectral profiles.

In some implementations, the first LEDs, the second LEDs, or the first and second LEDs may be color-changeable LEDs.

In some implementations, the first LEDs may include multiple sets of first LEDs, each set of first LEDs may be configured to emit light having a corresponding spectral profile that is different from the spectral profiles emitted by the other set or sets of first LEDs, and each set of first LEDs may be distributed throughout the circular region.

In some implementations, the second LEDs may include multiple sets of second LEDs, each set of second LEDs may be configured to emit light having a corresponding spectral profile that is different from the spectral profiles emitted by the other set or sets of second LEDs, and each set of second LEDs may be distributed throughout the annular region.

In some implementations, the apparatus may include an imaging sensor and one or more lenses. In such implementations, the one or more lenses and the imaging sensor may be centered on the center axis, the one or more lenses may be interposed between the imaging sensor and the substrate, the one or more lenses may have an angle of coverage that defines a conical reference volume, and the second surface or second surfaces of the light guide may lie entirely outside of the conical reference volume.

In some such implementations, the one or more lenses may be a non-telecentric lens system.

In some implementations, the one or more second surfaces may have a profile or profiles in cross-sections taken in planes parallel to and coincident with the center axis such that a normal or normal to the profile or profiles makes a first acute angle with respect to the center axis, the conical reference volume may be defined by a second acute angle with respect to the center axis, and the first angle may be at least 5° larger than the second angle.

In some implementations, the one or more lenses may include a first compound lens and a second compound lens, the first compound lens and the second compound lens may each have a corresponding first end and a corresponding second end, the first compound lens and the second compound lens may have substantially similar optical characteristics such that when light passes through the first compound lens from the first end to the second end thereof, the resulting image that is produced is substantially similar to an image that is produced when that same light passes through the second compound lens from the first end to the second end thereof, and the first and second compound lenses may be oriented such that their first ends point towards each other.

In some implementations, the apparatus may further include a sample chamber receptacle that is configured to receive a sample chamber such that the sample chamber, when received by the sample chamber receptacle, is interposed between the light guide and the one or more lenses.

In some such implementations, the apparatus may further include an excitation light source configured to direct light of a particular spectral profile towards a location in which the sample chamber, when received by the sample chamber receptacle, is located.

In some implementations, the excitation light source may be a laser configured to direct a beam of light in a direction perpendicular to the center axis.

BRIEF DESCRIPTION OF DRAWINGS

Embodiments are illustrated by way of example and not limitation in the figures of the accompanying drawings, in which like references indicate similar elements.

FIG. 3A is a top view of a solid-state illumination system, according to an example embodiment.

FIG. 4A is a schematic diagram showing capture of a signal via a reverse lens, according to an example embodiment.

DETAILED DESCRIPTION

Figure 1A:
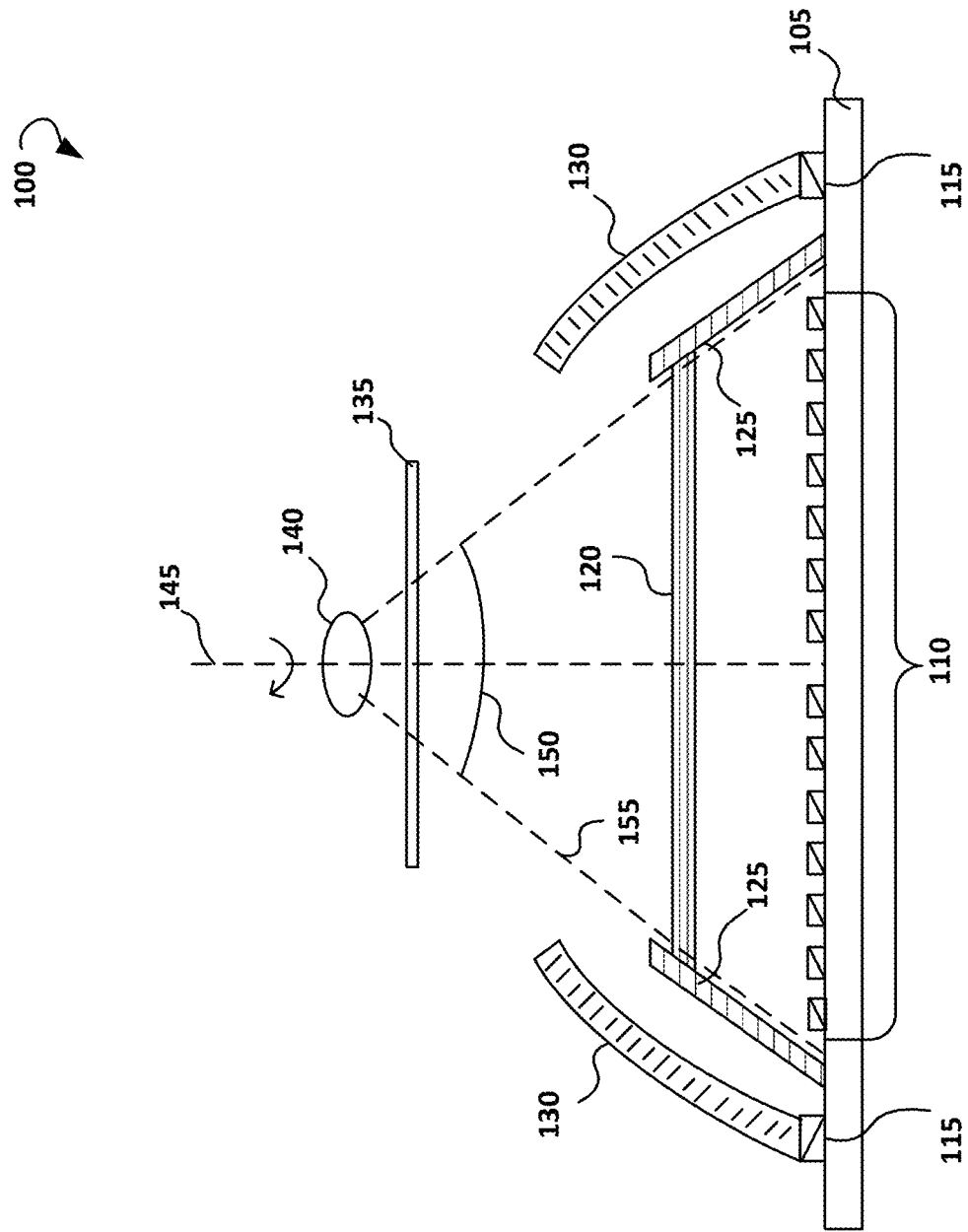
FIG. 1A is a schematic cross section view of a solid-state illumination system, according to an example embodiment.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The disclosure relates to a solid-state illumination system for use in a non-telecentric microscopy device for detecting chemicals, parasites, biomarkers, and other microorganisms in a specimen. The disclosed solid-state illumination system provides both bright-field and dark-field illumination capabilities in a compact, common device and allows for simultaneous use of both illumination types or use of either illumination type in isolation. The disclosed solid-state illumination system is also able to be made with solid state illumination devices, making it rugged and inexpensive to implement, thereby making it ideal for use in portable field microscopy devices that may see harsh environments. In one example embodiment, the solid-state illumination system can be used for helping in detection of a signal using an inexpensive microscopy-based detection system. The solid-state illumination system can be used in combination with other specimen illumination and fluorescence generation and detection techniques. The solid-state illumination system can be used for bright-field microscopy, dark-field microscopy, and fluorescence microscopy. Such a solid-state illumination system can be used as an inexpensive solution for solving global health problems, for molecular diagnostics, in veterinary medicine, and in other applications.

The solid-state illumination system can be part of a microscopy system utilizing, for example, a mobile phone camera module (although it will be recognized that the solid-state illumination system may also be used in conjunction with other types of microscopy imaging systems or microscopy devices). Such an example microscopy system can include a reverse lens and the mobile phone camera module. The microscopy system can be used to detect fluorescence in a specimen in order to measure the presence and amount of a chemical and microorganisms, for example, in human breath, blood, or another biological sample. A reverse lens is a lens that is designed so as to have a rear focal plane that is intended to be coincident with the imaging plane of an imaging sensor and a front focal plane that is intended to be coincident with the object being imaged but is then turned 180° so that the two planes are swapped. It will be understood that reference to a "lens" in this disclosure is inclusive of single lenses as well as compound lenses. Such a reverse lens may be disposed between a specimen and a mobile phone camera module (which, itself, has a lens) such that the back side of the reverse lens points outwards from the mobile phone camera module and the front side of the reverse lens faces toward the mobile phone camera module. When a reverse lens is used normally, i.e., not in a reversed configuration, the back side of the reverse lens would face towards the mobile phone camera module, and the lens would focus light from far away reducing an image of an object located far away. When reversed and coupled with a normally-oriented lens (such as may be part of a camera module in a cell phone), the normal/reverse lens pair may be used to create an approximately 1-to-1 magnification image of objects near the lens onto the sensor. The reverse lens, for example, may be a lens that is similar to that which is used in the cell phone camera module. In other words, reversing the lens does not change the general behavior of the microscopy system. In particular, flipping the lens reduces aberrations in the system to effectively "undo" what the lens of the mobile phone camera module is doing. Therefore, it is the pairing of the lens of the mobile phone camera module with this added reversed lens that makes this compact microscopy system.

The microscopy system can be used as a platform for creating a variety of diagnostics, including direct visualization of parasites using a handheld device. When compared to the traditional microscopy, the microscopy system of the present disclosure is lower in cost, compact, durable, and has a wider field of view.

In one example embodiment, the microscopy system can include a housing for holding the solid-state illumination system, the mobile phone camera module, the reverse lens and related support hardware, and a chamber for containing the specimen. The chamber with the specimen can be disposed between the solid-state illumination system and the reverse lens. The reverse lens can be configured to project an image of, or fluorescence from, the specimen onto the image sensor of the mobile device via the mobile phone camera module contained therein. The housing may include a processor connected to the mobile device camera module. The processor can be configured to analyze the image of fluorescence to detect the presence and amount of a chemical in the specimen.

Referring now to the drawings, FIG. 1A is a schematic cross section view of a solid-state illumination system 100, according to an example embodiment. In one example embodiment, the solid-state illumination system 100 includes a printed circuit board (PCB) or substrate 105, an array of light-emitting diodes (LEDs) 110, a ring of LEDs 115 encircling the array of LEDs 110, a separator-diffuser 120, an opaque mount 125 for supporting the separator-diffuser 120, and an optically transmissive light guide 130 that encircles the opaque mount 125 and the array of LEDs 110 and that is positioned so as to receive light from the ring of LEDs 115 through one side and transmit such light, via internal reflectance, out of an opposing side. The array of LEDs 110 and the ring of LEDs 115 may each be able to be separately activated, e.g., the LEDs 110 may be on one circuit and the ring of LEDs 115 on another, such that the array of LEDs 110 may be illuminated without the ring of LEDs 115 being illuminated, the ring of LEDs 115 may be illuminated without the array of LEDs 110 being illuminated, or the array of LEDs 110 and the ring of LEDs 115 may be illuminated in parallel.

The solid-state illumination system 100 can be installed in a portable device. The portable device can include a chamber for placing a sample 135 between a lens 140 (reverse lens) and the solid-state illumination system 100; the chamber may be removable, e.g., such as a slide or cartridge, and may be insertable into a chamber receptacle in the device such that the sample chamber is positioned in between the solid-state illumination system 100 and the lens 140. The solid-state illumination system 100 can be axisymmetric or generally axisymmetric (for example, the LEDs may generally be arranged in a circular or radial array (a pattern having one or more degrees of radial symmetry, and the light guide 130 may be radially symmetric) with respect to optical center axis 145 of the lens 140. The lens 140 may be associated with an angle of coverage 150 that defines a conical volume 155 that represents the range of potential angles with respect to the center axis 145 along which light that strikes the lens 140 where the center axis 145 intersects the lens 140 is actually able to pass through the lens and reach the imaging sensor (or the structure to which the imaging sensor is mounted).

The array of LEDs 110 is positioned such that the LEDs 110 fall within the conical volume 155 defined by the angle of coverage 150 of the lens 140 and can thus be used to provide bright-field illumination. In contrast, the ring of LEDs 115 is positioned and sized such that the LEDs 115 are outside of the conical volume 155 defined by the angle of coverage 150 of the lens 140 and can thus be used to provide dark-field illumination. It should be noted that mention of angle of coverage 150 is referring to the field of view as a whole, i.e., the angle beyond which no part of the field of view will allow light to pass. The illumination schemes mentioned here therefore provide pseudo-uniform illumination across the entire field of view, despite the fact that the non-telecentric nature of the optical system means that different areas of the field of view illuminated by the same angle of light may experience differing contrast modalities (e.g. brightfield in one area, and darkfield in another). The light emitted by the LEDs 115 is directed at the sample 135 via a light guide 130 and scatters off the sample 135 and parts of system 100 while opaque mount 125 may act to prevent light (or at least most light) emitted from LEDs 115 from directly hitting the separator-diffuser 120 (as opposed to being emitted from LEDs 115 and then reflecting off of one or more surfaces) and then being directed, e.g., via diffusion through the separator-diffuser 120, to the sample 135 as bright-field illumination. The opaque mount 125 may also act to prevent most light emitted from the LEDs 110 from directly hitting the light guide 130 and thus reduce potential dark-field illumination of the sample that may arise from using the bright-field illumination capability of the system 100.

The light guide 130 may be a generally axially or radially symmetric structure, e.g., one that is axially or radially symmetric about the center axis 145 through a sector or sectors totaling at least 250° of arc (e.g., two 150° sectors of arc). The light guide 130 may have a first surface that is oriented to face towards the LEDs 115, e.g., the first surface may be parallel to and face towards the printed circuit board 105 and the LEDs 115 mounted thereupon, and one or more second surfaces that face generally towards a circular region where a sample to be imaged is intended to be located. The circular region may be centered on the center axis 145 and on a reference plane (which may be thought of as the focal plane of the lens 140) that is perpendicular to the center axis 145 and spaced off from the printed circuit board 105 by a distance X. The second surface or second surfaces may be interposed between the plane and the printed circuit board 105 at a distance of less than X from the printed circuit board 105. The second surface(s), for example, may, in a cross-section taken in a plane that is coincident with and parallel to the center axis 145, have an average normal that passes through the circular region. In the depicted example, the second surface shown is a conical frustum surface, e.g., having a flat profile when viewed in cross-section, but the second surface may also have other profiles, e.g., curved so as to focus the light emitted therefrom. As shown, the second surface or second surfaces are positioned at locations outside of the conical volume 155 such that even if some light emitted from the second surface(s) is emitted at an angle relative to the center axis that is within half of the angle of coverage 150, such light is not able to travel directly into and through the lens 140 without first reflecting off of some other object, e.g., such as the separator-diffuser 120. Thus, the light that is emitted from the LEDs 115 that reaches the circular region where the sample is to be imaged may generally strike the sample chamber at a relatively shallow angle, thereby reflecting back down towards the opposite side of the light guide 130 or passing through the chamber along generally the same path (with some lateral offset due to refractive effects). However, if the light that passes through the chamber strikes any specimens or other items to be imaged in the sample contained in the chamber, the light will be subjected to scattering and some of the scattered light will travel along paths that lead into the lens 140 such that an imaging sensor may the detect the light and produce an image of the specimen or other items.

As noted above, the array of LEDs 110 may be used for bright-field illumination. The separator-diffuser 120 may act as both an attenuator and a diffuser and is designed to let at least some of the light from the array of LEDs 110 (the strongest intensity portions of which may directly illuminate the separator-diffuser 120 with generally higher-intensity light compared to light that reaches the separator-diffuser indirectly, e.g., after reflecting off of one or more surfaces) to pass through it while, at the same time, attenuating or absorbing lower-intensity light that may strike the separator-diffuser, e.g., light that is emitted from the second surface(s) of the light guide 130 or reflected off of other surfaces, e.g., the sample chamber or nearby components of the system 100.

Figure 1B:
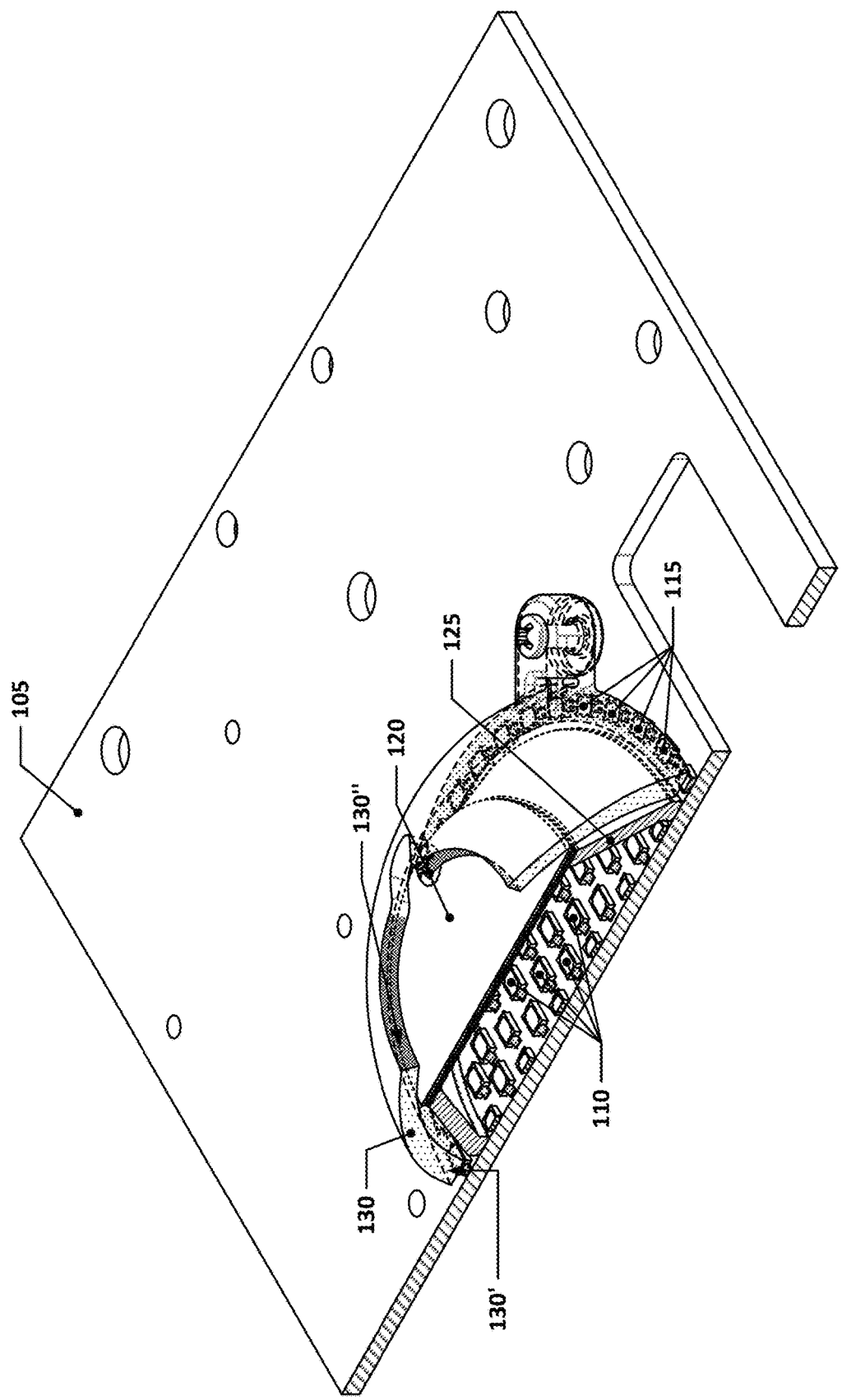
FIG. 1B is a three-dimensional cutaway view of an example solid-state illumination system similar that shown in FIG. 1A.

FIG. 1B is a three-dimensional cutaway view of an example solid-state illumination device similar to that shown in FIG. 1A. As can be seen, the light guide 130 has a generally dome-like overall shape extending upward from a first surface 130' that faces towards the LEDs 115. A center portion of the dome shape is omitted to form the second surface(s) 130". In this particular example the light guide 130 is generally axially symmetric, with the only non-axially symmetric portions thereof being two ears or tabs that protrude outward from proximate the first surface 130' in order to provide mounting features for mounting screws to interface with, and two notches in the second surface(s) 130" that are provided to allow for screwdriver access to screws used to hold the separator-diffuser 120 in place on the opaque mount 125 and above the LEDs 110.

Figure 2A:
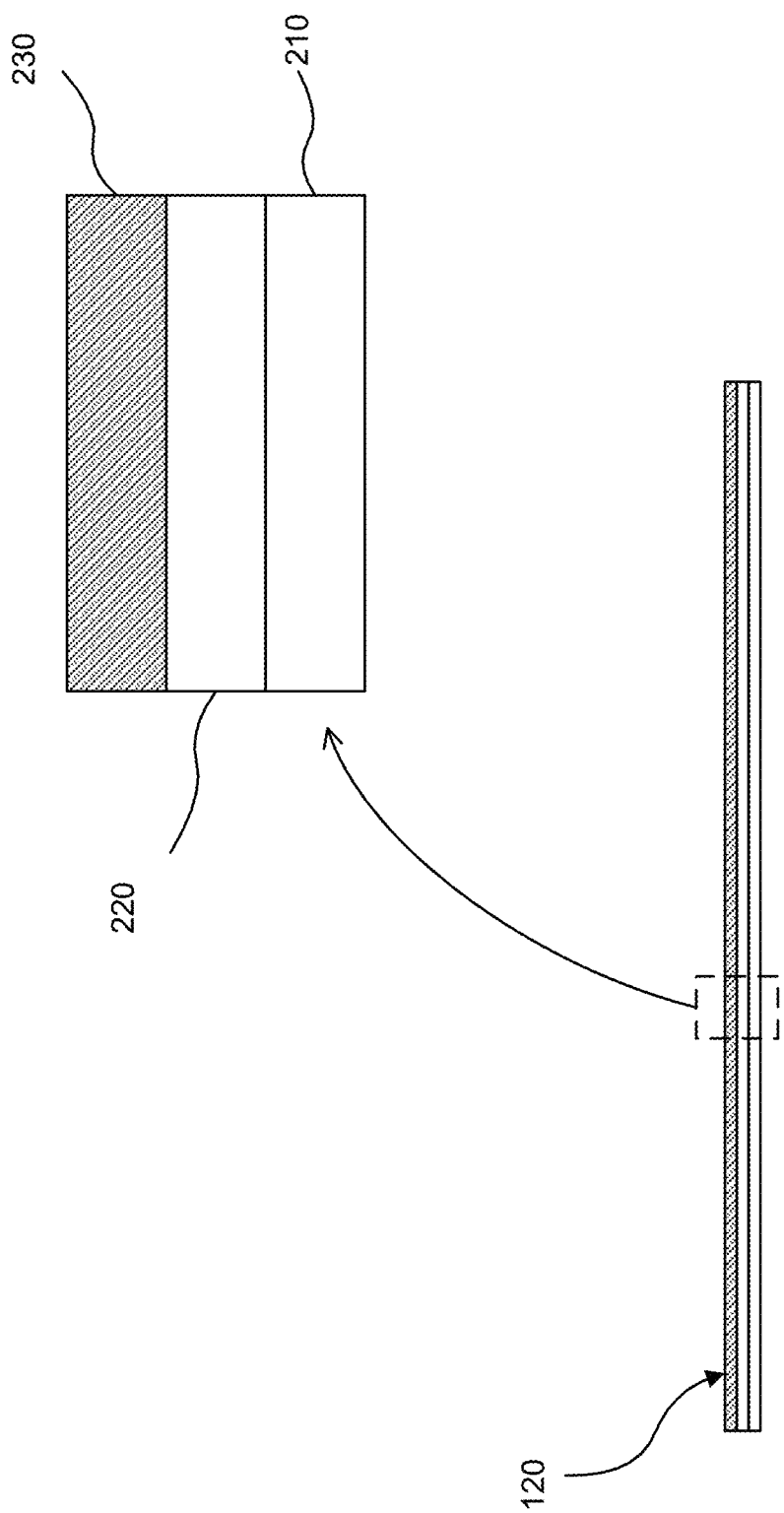
FIG. 2A is an enlarged view of a diffuser of the solid-state illumination system, according to an example embodiment.

FIG. 2A is an enlarged view of the separator-diffuser 120, according to an example embodiment. The example separator-diffuser 120 can include a layer 210, a layer 220, and a layer 230. Both the layer 210 and the layer 220 can be made of clear acrylic material. The surfaces of layers 210 and 220 can be ground with sandpaper (e.g. 120-grit sandpaper) to make them diffusive and reduce their specularity. The thickness of the layers 210 and 220 can be, for example, 200 micrometers each. The layer 230 can be made of black diffusive acrylic material. For example, a high-specularity black acrylic material may be used and the surfaces thereof ground with sandpaper (e.g. 220-grit sandpaper) to make the material diffusive in nature and to increase its absorption. The layer 230 can be 350 micrometers thick.

The separator-diffuser 120 may include the top layer 230 made of black acrylic material which scatters the light. Generally speaking, the top layer 230 may be made of any low-reflectivity, high-absorption material, e.g., stretched black latex, smoked sandblasted glass, etc., that acts to absorb or scatter lower-intensity light but allows higher-intensity light, or a portion thereof, to pass therethrough, for example, material that is highly scattering but has a low transmissivity, e.g., approximately 1% per mm. The thickness of the layer 230 can be tuned to allow a certain acceptable amount of light to pass through, e.g., to allow sufficient bright-field light to pass through to be able to saturate the image sensor used at an exposure duration of 1/30 of a second or less. As the top layer 230 is still at least somewhat transmissive to the light emitted by the LEDs 110, the LEDs 110 of the solid-state illumination system 100 can be used for bright-field microscopy.

Both surfaces, or at least the surface facing the lens 140, of the layer 230 are ground with a 220-grit sandpaper, to make the solid-state illumination system 100 more suitable for use with dark-field microscopy. The ring of LEDs 115 can be located outside the conical volume 155 and the clear polished light guide 130 can direct the light from the ring of LEDs 115 towards the circular region that will contain the sample 135. Specifically, the clear polished light guide 130 can reflect, e.g., via the mechanism of total internal reflection, the light produced by the ring of LEDs 115 such that the resulting light beams emitted by the second surface(s) of the light guide 130 that reach the sample 135 do so at a certain range of angles relative to the center axis 145. The range of angles can, for example, be between 45 and 60 degrees. Striking the sample 135 with light from the light guide 130 at angles of less than 45 degrees to the center axis 145 may cause such light to enter and pass through the lens 140 instead of only entering the lens 140 when scattered off of an object, e.g., a specimen, in the sample 135. Striking the sample 135 with light from the light guide at angles of more than 60 degrees to the center axis 145 may increase the chances of unwanted reflections of such light inside the reverse lens 140. Light that is emitted from the light guide 130 towards the separator-diffuser 120 (or light that reflects onto the separator-diffuser 120) may, for the most part, be absorbed and/or diffused by the layer 230, thus reducing the potential that such light will reflect back into the lens 140. Recognizing that different lens systems may have different angles of coverage, it will be appreciated that in some implementations, e.g., those in which the cross-sectional profile of the second surface is flat or nearly flat, e.g., forming a conical frustum surface, the normal or normals to such a second surface or surfaces may make an acute angle with respect to the center axis that is at least 5° greater than an acute angle formed between the center axis and the conical volume defined by the angle of coverage of the lens used.

Figure 2B:
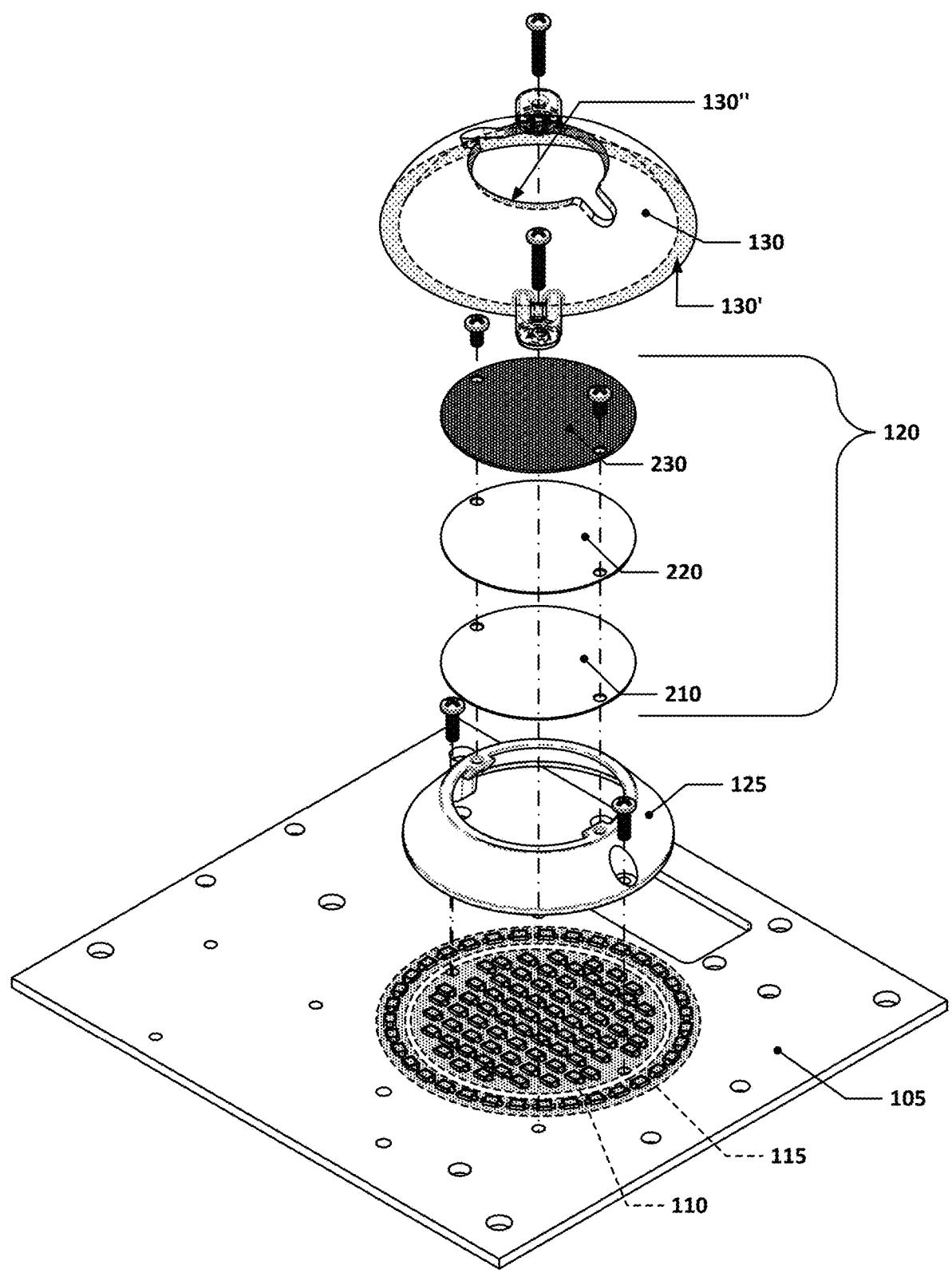
FIG. 2B is a three-dimensional exploded view of the example solid-state illumination system of FIG. 1B.

FIG. 2B depicts a three-dimensional exploded view of the example solid-state illumination system of FIG. 1B. As shown, the separator-diffuser 120 is formed of three layers, as described above. Also evident is the relative simplicity of assembly of the example solid-state illumination system. There are only approximately 6 main components—the light guide 130, the three layers of the separator-diffuser 120, the opaque mount 125, and the printed circuit board 105 (with the LEDs 110 and 115 mounted thereto), as well as a handful of fasteners that may be used to assembly the various components together. Of course, it will be understood that other assembly methods may be used as well, including heat-welding, adhesives, rivets, etc., in order to hold the assembly together. Additionally, as discussed below, the separator-diffuser may, for example, be made as a single-part component, e.g., a single layer, in which case the there may only be 4 main components— the light guide 130, the separator-diffuser 120, the opaque mount 125, and the printed circuit board 105 (with the LEDs 110 and 115 mounted thereto). These four components, when assembled, provide a solid-state illumination device that may be used for either or both bright-field illumination and dark-field illumination.

In other embodiments, instead of the three-layer separator-diffuser 120 shown in FIG. 2A, it can be possible to use a single layer made of, for example, diffusive smoke acrylic material, with a low absorption ratio, such that the light from the LEDs 110 can still pass therethrough but light from the LEDs 115 that strikes the separator-diffuser 120 may largely be absorbed or scattered. In other words, the diffusive smoke acrylic material can perform the same function as the separator-diffuser 120.

The single layer separator-diffuser can be also carried out as a pure white acrylic sheet of 0.5 to 1 millimeter thick. The pure white acrylic sheet can be dyed with a darker grey color. Such a sheet of acrylic material is not transparent but is translucent enough to allow a certain amount of light pass through. At the same time, the sheet of acrylic material should be dark enough to absorb any light bounced back from the sample. In one embodiment, the acrylic sheet can be dyed such that a gradient develops through the thickness of the acrylic sheet, e.g., the bottom of the acrylic sheet may be white and at the top the acrylic sheet is black, with the color changing gradually from white to black through the thickness of the sheet. An absorption coefficient of such acrylic sheet may change exponentially from the bottom to the top.

While several specific examples of the separator-diffuser 120 are described above, it will be generally recognized that the separator-diffuser 120 may be implemented in a variety of different ways, including single- and multi-layer separator-diffusers. In multi-layer separator diffusers, the layers may be directly adjacent to one another or two or more of them may be spaced apart by some distance to provide an air gap, which may help with diffusion. Generally speaking, the separator-diffuser may be described as a structure that acts as an absorbing medium to scattered light rays while still allowing non-scattered light from the LEDs 110 to pass therethrough. Accordingly, the separator-diffuser may have a first surface that is further from the substrate 105 and a second surface that is closer to the substrate 105 (in other words, the second surface may be in between the first surface and the substrate 105); the material that provides the first surface may have an absorption coefficient that is higher than the absorption coefficient of the material that provides the second surface.

FIG. 3A is a schematic top view of a solid-state illumination system 100, according to an example embodiment. The solid-state illumination system 100 can be located below the sample 135. The separator-diffuser 120 and the clear polished light guide 130 of the solid-state illumination system 100 are seen in FIG. 3A, while other components of the of the solid-state illumination system 100 are obscured. Such an arrangement may, for example, allow for bright-field and/or dark-field illumination of the sample 135 to be performed simply by changing which LEDs 110 and 115 are powered, i.e., without any required mechanical reconfiguration. The solid-state illumination system 100 may also be combined with an optional excitation light source, e.g., a laser or focused LED, that emits light of a particular wavelength or spectral profile into the sample 135.

For example, the sample 135 may include a specimen that has been tagged or labeled with a fluorescent indicator that produces light of a particular wavelength when exposed to external stimulation, e.g., excitation via exposure to a different wavelength of light. For example, light from a laser 310 may be directed into the sample 135, either directly or via reflection off of one or more mirrors or through one or more prisms, such as prism 330. The excitation light may be produced by the laser 310 and optionally filtered by a narrow bandpass filter 320 (for example, a 405 nanometer filter with a 10 nm bandwidth) and then deflected by prism 330 such that the filtered excitation light strikes the sample 135, thereby illuminating the tagged specimen(s) therein and causing the tagged specimen(s) to fluoresce. In some embodiments, a mirror can be used instead of the prism 330, or the laser 310 or other illumination source (e.g., LEDs) may be oriented to emit light directly towards the sample chamber, thereby allowing omission of the prism 330 (or reflector).

Figure 3B:
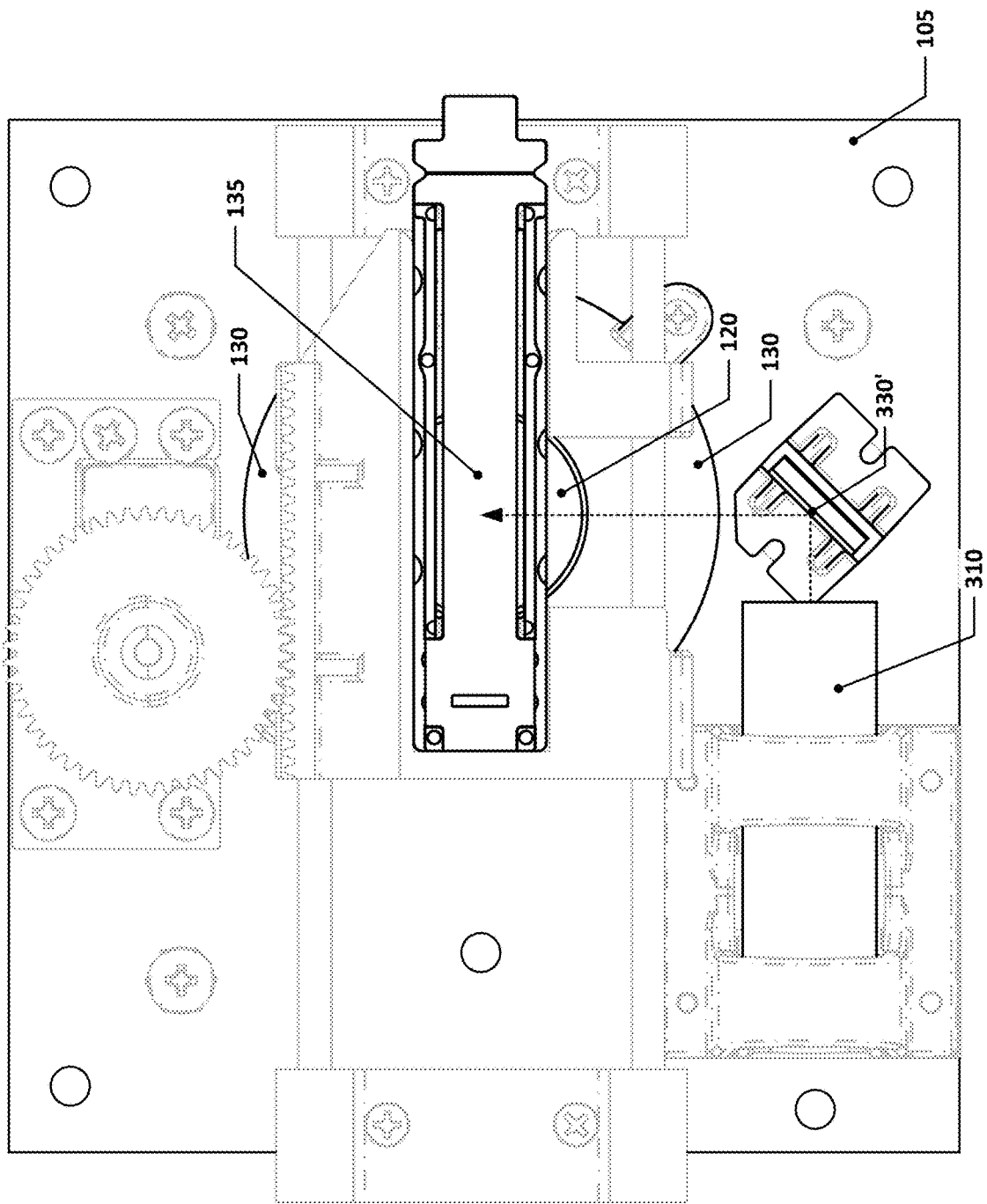
FIG. 3B is a top view of another solid-state illumination system, according to another example embodiment.

FIG. 3B shows a top view of another example system using a solid-state illumination system as discussed herein. The separator-diffuser 120 and the light guide 130 are both visible, centered (at least in the vertical direction with respect to FIG. 3B's orientation) underneath the sample 135 (e.g., a sample chamber, cuvette, or slide). The laser 310 may emit a laser beam that may strike a mirror 330' and be turned 90° so as to enter the sample 135 from the side, thereby exposing the specimen therein to excitation illumination that may cause a fluorescent indicator label to fluoresce.

Such a system that combines the solid-station illumination system discussed herein with a fluorescence excitation light source may allow for combined dark-field illumination and fluorescent illumination techniques to be performed simultanesouly. For example, the laser 310 may be configured to emit light of a first wavelength that causes a tagged or labeled specimen to emit light of a second wavelength that may be detectable via the imaging system via the lens 140. At the same time, the LEDs 115 may be configured to emit light of a third wavelength that may be used to illuminate, via dark-field illumination, the specimens in the sample 135 as well. Such a technique may, for example, allow cells within the sample 135 to be imaged using visible light provided by the dark-field illumination functionality of the solid-state illumination system while the fluorescing light may allow for tagged or labeled portions of those cells to be identified in the image (the first/second/third wavelengths may all be different wavelengths).

FIG. 4A is a schematic diagram 400 showing capture of a signal via a reverse lens according to an example embodiment in which a laser is used to provide excitation light to cause a sample to fluoresce. Light scattered by sample 135 passes through lens 140, a long pass filter 410 (for example, a 450 nanometer filter), and a lens 420. The difference between a wavelength of the narrow bandpass filter 320 and a wavelength of the long pass filter 410 may depend on the maximum viewing angle of the lens 140, e.g., the angle of coverage 150. The bandpass filter 320 may need to allow the majority of the laser spectrum through in order to efficiently illuminate the sample 135. The higher the maximum viewing angle, the more spectrally shifted the filter becomes at the edge of the field of view, until the filter starts overlapping with the band pass filter. If the lens 140 has a maximum viewing angle of 35 degrees from the center axis 145, the 450 nanometer long pass filter may, for example, effectively become a 415 nanometer long pass filter at the edge of the field of view. In further example embodiments, the shift may be significantly more or less depending on the chosen filter. After passing through the lens 420, the light may be captured by sensor 430, e.g., a charge-coupled device (CCD) sensor or other pixelated imaging sensor. The lens 140 may be fixed in place, and the lens 420 and sensor 430 may be part of mobile phone camera module (e.g., a camera module designed to be used in mobile phones, but here repurposed for use in a small-format microscopy system). The lens 420 may be configured to be movable to allow the focus of the system to be adjusted so as to be able to fine-tune the image of the sample 135. For example, the lens 420 may be mounted on a voice coil motor (VCM) that may be activated to adjust the position of the lens 420 to focus on the image.

Figure 4B:
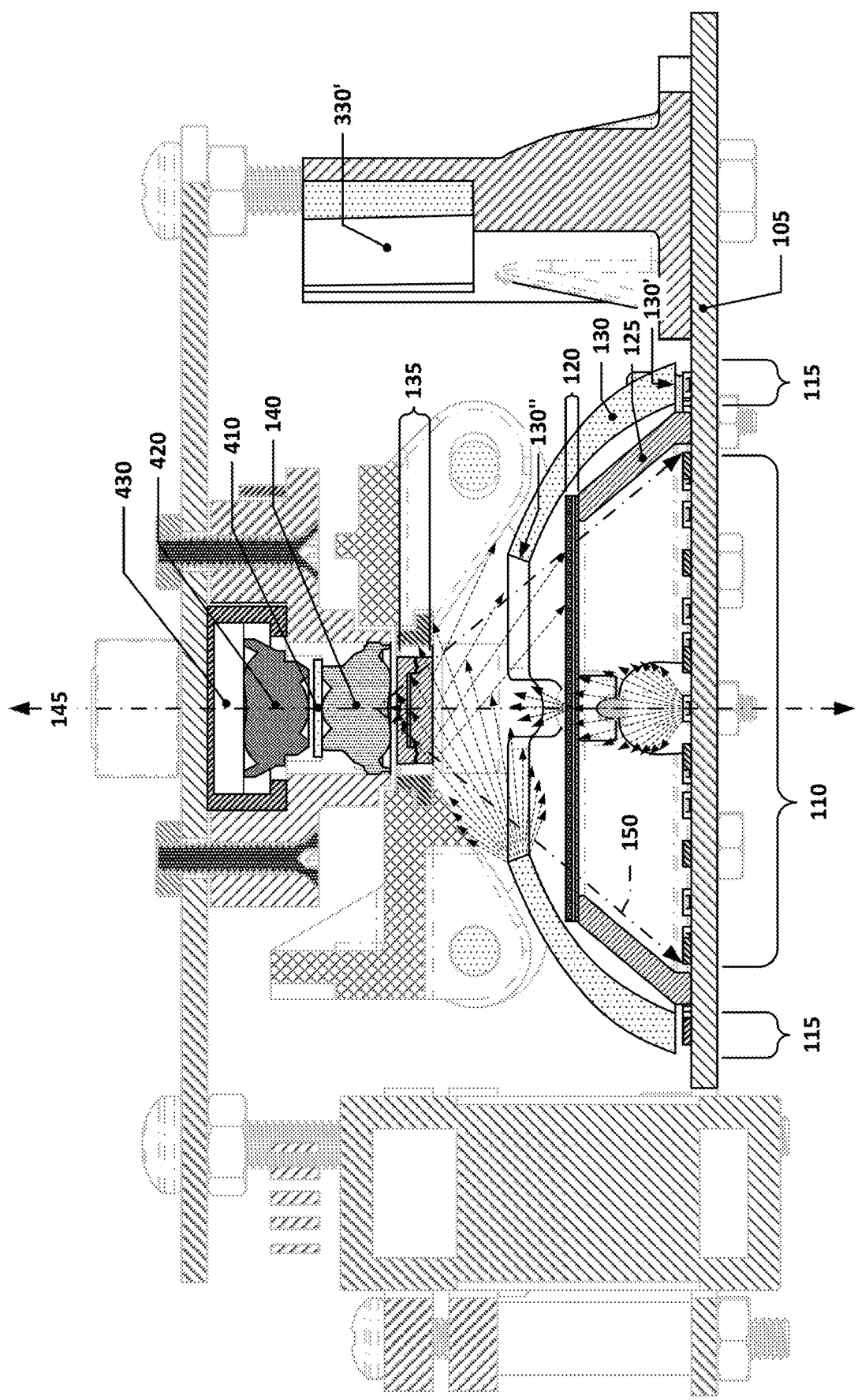
FIG. 4B is a section view of an example solid-state illumination system according to another example embodiment.

FIG. 4B depicts a side section view of another example of an imaging system that uses a solid-state illumination device. Visible in FIG. 4B are various components shown in grey which provide ancillary structure or other features not discussed at length herein. Also visible in FIG. 4B in black are various structures such as are discussed herein. For example, a solid-state illumination device is shown that has LEDs 110 and 115, a light guide 130, a separator-diffuser 120, a printed circuit board 105, and an opaque mount 125. The light guide may receive light from the LEDs 115 via a first surface 130' and guide such light through the light guide 130 such that it exits a second surface or surfaces 130" generally along a vector that is oriented towards the portion of the sample 135 that is located beneath the lens 140 (lens 140 and lens 240 are compound lenses and are similar in design, but the internals of the lenses 140 and 240 are not reproduced here; the lenses 140 and 240 may, for example, be commercial-off-the-shelf (COTS) lens assemblies intended for use in cell phone camera modules, for example). The lens 140 may have a filter 410 positioned between it and the lens 420, e.g., as discussed earlier.

As can be seen, the light emitted from the second surface 130" of the light guide 130, as represented on the left side by the dotted arrows radiating out from the left second surface 130" (similar light emission may occur generally around the circumference of the light guide 130), may be emitted along a number of angles, although the intensity of the emitted light will generally fall off with increasing angle away from the center of the illumination pattern. Some of the emitted light will strike the sample 135, which may be (or be located in) an optically transparent structure, e.g., a cuvette, slide, chamber, etc., and may then enter into the sample 135 at an angle with respect to the center axis 145 that is too great to be within the angle of acceptance 150 of the lens 140, i.e., even if such light hits the lens 140 at that angle, it will not have the ability to pass through the lens 140. Some of the emitted light that strikes the sample 135 will also be reflected off of the optically transparent material used to house the sample and will scatter to other regions within the imaging system. However, some of the light that enters the sample 135 may strike objects to be imaged, e.g., cells, viruses, bacteria, etc. and scatter off of those objects, as represented by the short arrows near the center axis 145 in the sample 135. Some of this scattered light will strike the lens 140 and be at a sufficiently shallow angle to the center axis 145 when it does that this scattered light will pass through the lens 140 and then the lens 240 to an imaging sensor 430.

Also shown in FIG. 4B is an example illumination pattern from one of the LEDs 110 near the center axis 145. Light from the LEDs 110 may strike the separator-diffuser 120, thereby being diffused, as indicated by the spray of shorter arrows emanating from the top center of the separator-diffuser 120, thereby providing diffuse light for bright-field illumination (this diffusive effect occurs across the entirety of the separator-diffuser 120).

Also visible in FIG. 4B is a mirror 330' that may be used to reflect a laser beam, as discussed earlier, into the sample 135 from the side for fluorescent excitation.

Referring back to FIG. 1, an advantage of the solid-state illumination system 100 over existing illumination solutions used in microscopy is the complete elimination of moving parts within the illumination system. The arrays of LEDs 110 and ring of LEDs 115 may both be mounted to a common printed circuit board and may be used to produce different forms of illumination, e.g., bright-field and/or dark-field illumination, without having to move any parts or change any filters. Specifically, the solid-state illumination system 100 can be useful in reverse lens systems or any non-telecentric optical system. It will be understood that the LEDs used in the array of LEDs 110 may all be selected to be of the same type, e.g., all emitting light of the same wavelength range/spectral profile, or may be selected so as to include different sets of LEDs 110 in which each set of LEDs 110 can be made to emit light of a different wavelength range/spectral profile. In the latter case, each set of LEDs 110 may be evenly distributed throughout the array of LEDs 110 and may be able to be independently powered, thereby allowing the intensity of light emitted by each set of LEDs 110 to be independently adjusted (or even turned off). In such an implementation, the wavelength of light used for bright-field illumination may be adjusted between multiple different values depending on the particular color of light desired. In yet other implementations, each LED 110 may be a color-changeable LED, e.g., able to be controlled so as to emit any of a variety of different wavelengths of light. The LEDs 115 used in the ring of LEDs 115 may similarly be selected, e.g., all of the same wavelength range/spectral profile, a mixture of several sets of LEDs, each set emitting a different wavelength range/spectral profile when powered (and each set independently controllable and the LEDs of each set evenly distributed about the ring of LEDs 115), or color-changeable LEDs.

The separator-diffuser 120 allows smoothing the transmission light produced by the array of LEDs 110, ensuring an even bright-field illumination pattern. Without the separator-diffuser 120, some portions of the bright-field illumination pattern may have a lower intensity of illumination due to the presence of non-light-emitting areas of PCB 105 between actively lit LEDs 110. The separator-diffuser 120 may act to distribute the light such that it is emitted in a more uniform manner across the area of the separator-diffuser 120 than it otherwise would be. In some embodiments, the separator-diffuser 120 may be located about 8 to 10 millimeters above the array of LEDs 110, although other distances may be used as well.

Thus, a solid-state illumination unit for use in a portable device for detecting chemicals in specimens has been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. An apparatus comprising:
    a solid-state system illumination system including:
        a plurality of first light-emitting diodes (LEDs) distributed across a circular region of a substrate,
        a plurality of second LEDs distributed within an annular region encircling the circular region,
        a light guide having one or more first surfaces facing towards the substrate and the second LEDs and one or more second surfaces facing at least partially radially inwards towards a center axis that passes through a center of the circular region of the substrate, the light guide made of an optically transmissive material,
        a separator-diffuser positioned within a volume bounded, at least in part, by the substrate and the light guide, the separator diffuser having a first surface facing towards the substrate and a second surface facing away from the substrate, wherein a material providing the first surface has a higher absorption coefficient than a material providing the second surface, and
        an optically opaque mount that supports the separator-diffuser within the volume, encircles the first LEDs, and prevents light from the first LEDs from reaching the light guide without first passing through the separator-diffuser and light from the second LEDs from reaching the first LEDs without also first passing through the separator-diffuser.

2. The apparatus of claim 1, wherein the separator-diffuser includes a thin layer of black diffusive material and one or more layers of translucent diffusive material interposed between the black diffusive material and the substrate.

3. The apparatus of claim 2, wherein the thin layer of black diffusive material is black diffusive acrylic material.

4. The apparatus of claim 3, wherein the thin layer of black diffusive material is black acrylic material that has been sanded or ground with 220-grit sandpaper.

5. The apparatus of claim 4, wherein the thin layer of black diffusive material is approximately 350 micrometers thick.

6. The apparatus of claim 1, wherein the light guide is dome-shaped and has a nominally circular opening in the center, centered on the center axis, that provides the one or more second surfaces.

7. The apparatus of claim 6, wherein the nominally circular opening is smaller than the separator-diffuser and the separator-diffuser is interposed between the nominally circular opening and the substrate.

8. The apparatus of claim 1, wherein the opaque mount has a conical frustum shape.

9. The apparatus of claim 1, wherein:
    the first LEDs are electrically connected with a first circuit in the substrate,
    the second LEDs are electrically connected with a second circuit in the substrate, and
    the first circuit and the second circuit are configured to be powered independently of one another.

10. The apparatus of claim 1, wherein the first LEDs all have an identical first spectral profile, the second LEDs all have an identical second spectral profile, or the first LEDs all have identical first spectral profiles and the second LEDs all have identical second spectral profiles.

11. The apparatus of claim 1, wherein the first LEDs, the second LEDs, or the first and second LEDs are color-changeable LEDs.

12. The apparatus of claim 1, wherein:
    the first LEDs include multiple sets of first LEDs,
    each set of first LEDs is configured to emit light having a corresponding spectral profile that is different from the spectral profiles emitted by the other set or sets of first LEDs, and
    each set of first LEDs is distributed throughout the circular region.

13. The apparatus of claim 1, wherein:
    the second LEDs include multiple sets of second LEDs,
    each set of second LEDs is configured to emit light having a corresponding spectral profile that is different from the spectral profiles emitted by the other set or sets of second LEDs, and
    each set of second LEDs is distributed throughout the annular region.

14. The apparatus of claim 6, further comprising:
    an imaging sensor, and
    one or more lenses, wherein:
        the one or more lenses and the imaging sensor are centered on the center axis,
        the one or more lenses are interposed between the imaging sensor and the substrate,
        the one or more lenses has an angle of coverage that defines a conical reference volume, and
        the one or more second surfaces of the light guide lie entirely outside of the conical reference volume.

15. The apparatus of claim 14, wherein the one or more lenses is a non-telecentric lens system.

16. The apparatus of claim 15, wherein:
    the one or more second surfaces of the light guide have a profile or profiles in cross-sections taken in planes parallel to and coincident with the center axis such that a normal or normal to the profile or profiles makes a first acute angle with respect to the center axis,
    the conical reference volume is defined by a second acute angle with respect to the center axis, and
    the first acute angle is at least 5° larger than the second acute angle.

17. The apparatus of claim 15, wherein:
    the one or more lenses includes a first compound lens and a second compound lens,
    the first compound lens and the second compound lens each have a corresponding first end and a corresponding second end,
    the first compound lens and the second compound lens have substantially similar optical characteristics such that when light passes through the first compound lens from the first end to the second end thereof, the resulting image that is produced is substantially similar to an image that is produced when that same light passes through the second compound lens from the first end to the second end thereof, and
    the first and second compound lenses are oriented such that their first ends point towards each other.

18. The apparatus of claim 14, further comprising a sample chamber receptacle that is configured to receive a sample chamber such that the sample chamber, when received by the sample chamber receptacle, is interposed between the light guide and the one or more lenses.

19. The apparatus of claim 18, further comprising an excitation light source configured to direct light of a particular spectral profile towards a location in which the sample chamber, when received by the sample chamber receptacle, is located.

20. The apparatus of claim 19, the excitation light source is a laser configured to direct a beam of light in a direction perpendicular to the center axis.

* * * * *